United States Patent
Cho et al.

(10) Patent No.: US 10,926,197 B2
(45) Date of Patent: Feb. 23, 2021

(54) MULTIFUNCTIONAL PHASE SEPARATION APPARATUS

(71) Applicant: HAMILTON SUNDSTRAND CORPORATION, Charlotte, NC (US)

(72) Inventors: Wei-Lin Cho, Unionville, CT (US); Gary A. Adamson, North Granby, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 246 days.

(21) Appl. No.: 16/015,850

(22) Filed: Jun. 22, 2018

(65) Prior Publication Data

US 2019/0388805 A1    Dec. 26, 2019

(51) Int. Cl.
| | | |
|---|---|---|
| *B01D 50/00* | (2006.01) | |
| *B01D 19/00* | (2006.01) | |
| *B01D 21/00* | (2006.01) | |
| *F04B 53/20* | (2006.01) | |
| *B01D 45/16* | (2006.01) | |
| *B01D 45/12* | (2006.01) | |

(Continued)

(52) U.S. Cl.
CPC ..... *B01D 19/0031* (2013.01); *B01D 19/0057* (2013.01); *B01D 21/0012* (2013.01); *B01D 45/12* (2013.01); *B01D 45/16* (2013.01); *F04B 53/20* (2013.01); *A47L 9/1666* (2013.01); *B01D 50/002* (2013.01); *F16T 1/38* (2013.01); *F24F 5/0035* (2013.01); *F25B 43/003* (2013.01); *F25B 43/006* (2013.01); *F25B 2400/02* (2013.01); *F25B 2400/23* (2013.01); *F28D 15/00* (2013.01); *F28D 15/0266* (2013.01)

(58) Field of Classification Search
CPC .......... B01D 19/0031; B01D 19/0057; B01D 21/0012; B01D 50/002; B01D 45/16; B01D 45/12; F04B 53/20; F28D 15/00; F28D 15/0266; F25B 2400/02; F25B 2400/23; F25B 43/006; F25B 23/006; F25B 43/003; F16T 1/38; F24F 5/0035; Y10S 55/03; A47L 9/1666
See application file for complete search history.

(56) References Cited

U.S. PATENT DOCUMENTS 3,127,255 A * 3/1964 Winslow ................. B04B 5/005
                                                                                        96/178
3,386,230 A * 6/1968 Riesberg ............ B01D 19/0031
                                                                                        55/337

(Continued)

FOREIGN PATENT DOCUMENTS

| EP | 3293469 A1 | 3/2018 |
|---|---|---|
| EP | 3355004 A2 | 8/2018 |

OTHER PUBLICATIONS

European Search Report Issued in European Application No. 19180317.0 dated Oct. 22, 2019; 6 Pages.

*Primary Examiner* — Dung H Bui
(74) *Attorney, Agent, or Firm* — Cantor Colburn LLP

(57) ABSTRACT

A multifunctional phase separation apparatus is provided herein. The multifunctional phase separation apparatus includes a porous tube, a phase separator, and liquid collecting modules. The porous tube includes a first entry port and an exit port. The phase separator includes a second entry port. The multifunctional phase separation apparatus also includes a reservoir. The reservoir is on a first end of the liquid collecting modules.

11 Claims, 4 Drawing Sheets

(51) Int. Cl.

| | |
|---|---|
| F28D 15/00 | (2006.01) |
| F28D 15/02 | (2006.01) |
| F25B 43/00 | (2006.01) |
| F16T 1/38 | (2006.01) |
| F24F 5/00 | (2006.01) |
| A47L 9/16 | (2006.01) |

(56) References Cited

U.S. PATENT DOCUMENTS

| | | | |
|---|---|---|---|
| 3,654,748 A * | 4/1972 | Bloom | B01D 19/00 |
| | | | 55/322 |
| 4,516,994 A * | 5/1985 | Kocher | B01D 45/12 |
| | | | 210/304 |
| 4,528,826 A | 7/1985 | Avery, Jr. | |
| 9,689,385 B2 | 6/2017 | Rohlfing et al. | |
| 9,714,561 B2 | 7/2017 | Hopper et al. | |
| 10,330,361 B2 * | 6/2019 | Cho | F25B 43/003 |
| 2015/0083651 A1 * | 3/2015 | Jons | B01D 21/0018 |
| | | | 210/196 |
| 2016/0030875 A1 * | 2/2016 | Parikh | B01D 50/002 |
| | | | 55/403 |

* cited by examiner

MULTIFUNCTIONAL PHASE SEPARATION APPARATUS

BACKGROUND

In a flow loop of a conventional flow system including a pump, a presence of gas/vapor on a pump suction side of the pump can be detrimental. Gas generation can be attributed to incompatibility between a working fluid and the wetted system materials, system cleanness, and/or the working fluid deterioration over time in harsh environments. Further, vapor can be generated when a power increase (e.g., in a two phase conventional flow system) overwhelms a heat exchanger/condenser capacity and the generated vapor cannot be fully condensed instantaneously. As a consequence, a return flow of the conventional flow system contains both liquid and vapor. The gas/vapor can damage the pump or cause a failure of the flow system (e.g., the pump will experience cavitation if the gas/vapor from the return flow is not removed). In addition to the damages caused by the presence of gas/vapor on the pump suction side, large particles entrained in the liquid can also cause damage in the flow system. Thus, there is a need for a gas/vapor barrier to prevent gas/vapor flow into the pump and to capture solid particles with certain size upstream to the pump suction side.

BRIEF DESCRIPTION

In accordance with one or more embodiments, a multifunctional phase separation apparatus that includes a porous tube, a phase separator, and liquid collecting modules is provided. The porous tube includes a first entry port and an exit port. The phase separator includes a second entry port. The apparatus also includes a reservoir. The reservoir is on a first end of the liquid collecting modules.

In accordance with one or more embodiments and the multifunctional phase separation apparatus embodiment above, the exit port of the porous tube can be coupled to a pump.

In accordance with one or more embodiments and the any of the multifunctional phase separation apparatus embodiments above, the first entry port of the porous tube can be coupled to a recirculation line.

In accordance with one or more embodiments and the any of the multifunctional phase separation apparatus embodiments above, the second entry port of the phase separator can be coupled to a system return.

In accordance with one or more embodiments and the any of the multifunctional phase separation apparatus embodiments above, a space can separate each of the plurality of liquid collecting modules to maximize an available storage space of the apparatus.

In accordance with one or more embodiments and the any of the multifunctional phase separation apparatus embodiments above, a second reservoir can be configured on a second end of the liquid collecting modules, the second end opposing the first end.

In accordance with one or more embodiments and the any of the multifunctional phase separation apparatus embodiments above, a porous media can enclose an outside surface of the phase separator.

In accordance with one or more embodiments and the any of the multifunctional phase separation apparatus embodiments above, a mechanically pumped single phase flow loop system comprises the multifunctional phase separation apparatus of claim.

In accordance with one or more embodiments and the any of the multifunctional phase separation apparatus embodiments above, a mechanically pumped two phase flow loop system comprises the multifunctional phase separation apparatus of claim.

In accordance with one or more embodiments, a mechanical pump flow loop system including a pump and an apparatus is provided herein. The apparatus includes a porous tube, a phase separator, and liquid collecting modules. The porous tube includes a first entry port and an exit port. The exit port of the porous tube is coupled to the pump. The phase separator includes a second entry port. The apparatus also includes a reservoir. The reservoir is on a first end of the liquid collecting modules.

In accordance with one or more embodiments and the mechanical pump flow loop system embodiment above, the exit port of the porous tube can be coupled to a pump.

In accordance with one or more embodiments and the any of the mechanical pump flow loop system embodiments above, the first entry port of the porous tube can be coupled to a recirculation line.

In accordance with one or more embodiments and the any of the mechanical pump flow loop system embodiments above, the second entry port of the phase separator can be coupled to a system return.

In accordance with one or more embodiments and the any of the mechanical pump flow loop system embodiments above, a space can separate each of the plurality of liquid collecting modules to maximize an available storage space of the apparatus.

In accordance with one or more embodiments and the any of the mechanical pump flow loop system embodiments above, a second reservoir can be configured on a second end of the liquid collecting modules, the second end opposing the first end.

In accordance with one or more embodiments and the any of the mechanical pump flow loop system embodiments above, a porous media can enclose an outside surface of the phase separator.

In accordance with one or more embodiments and the any of the mechanical pump flow loop system embodiments above, the mechanical pump flow loop system can be a two phase flow loop system.

In accordance with one or more embodiments and the any of the mechanical pump flow loop system embodiments above, the mechanical pump flow loop system can be a single phase flow loop system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In general, one or more embodiments include a multifunctional phase separation apparatus that provides a gas/vapor barrier to prevent gas/vapor flow into a pump of an active thermal control system and to capture solid particles with certain size upstream to a pump suction side of the active thermal control system. The multifunctional phase separation apparatus utilizes capillary force created by a porous media and a liquid phase of a working fluid to form a barrier to prevent any vapor/gas flow into the pump suction side. The porous media can also serve as a filter to block particles. A separated non-condensable gas (NCG) can be stored in a reservoir of the multifunctional phase separation apparatus, where the concentration of the NCG in the active thermal control system can decrease over time. A vapor phase of the working fluid can be recaptured by the multifunctional phase separation apparatus once the working fluid re-condenses back to a liquid phase. A recirculation line can be routed from the pump to the multifunctional phase separation apparatus to ensure a feed line to the pump is always liquid filled.

In one or more embodiments, the multifunctional phase separation apparatus is used as an accumulator in a two phase flow loop. The technical effect and benefits of the one or more embodiments include preventing, by the multifunctional phase separation apparatus, any NCG/vapor and certain size solid particles from flowing into the pump suction side with a minimum pressure drop penalty. By preventing such flow, the multifunctional phase separation apparatus, can reduce or eliminate a possibility of damages caused by cavitation or large solid particles.

Figure 1A:
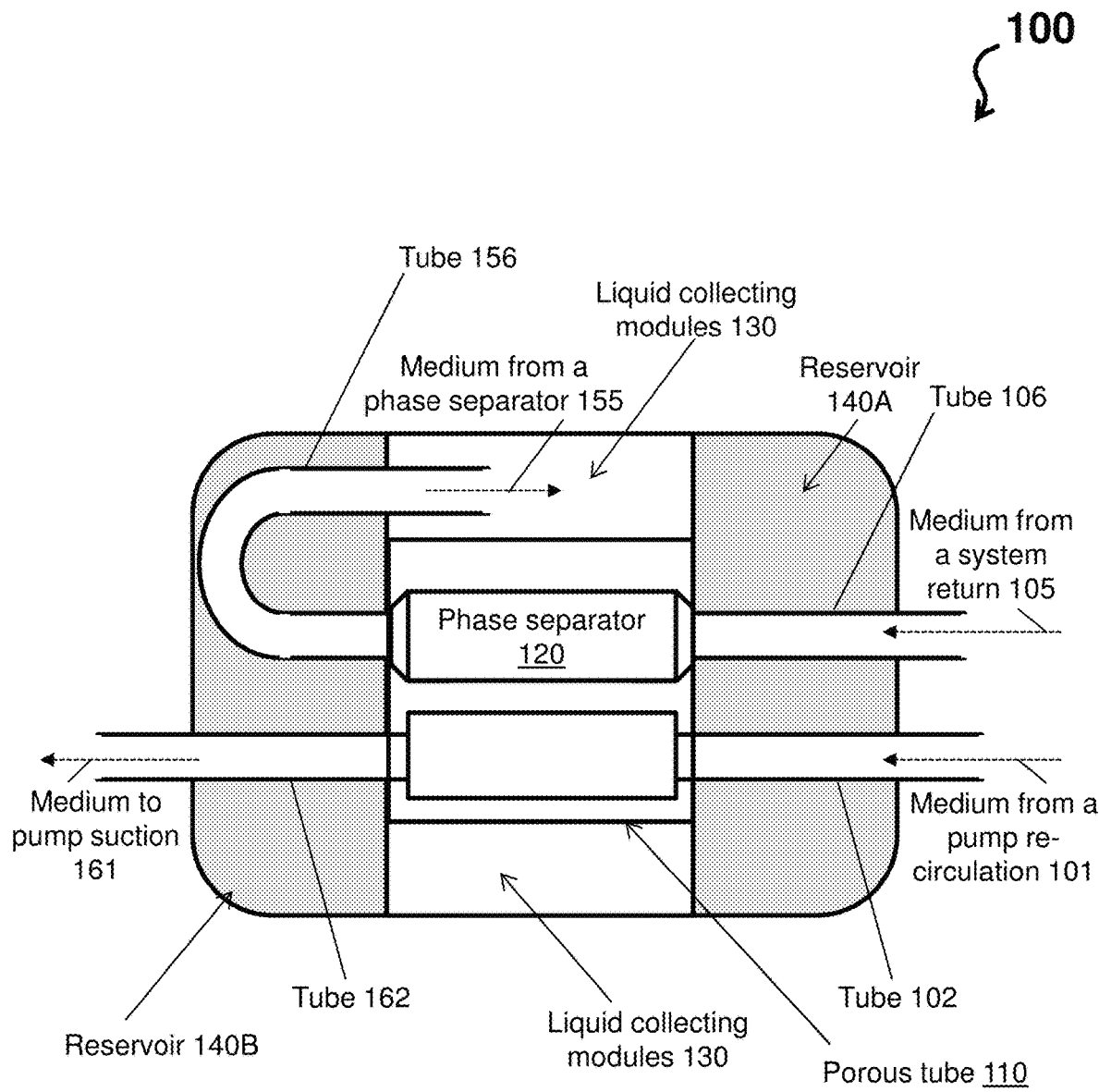
FIG. 1A depicts a cross-sectional view of an apparatus in accordance with one or more embodiments.
Figure 1B:
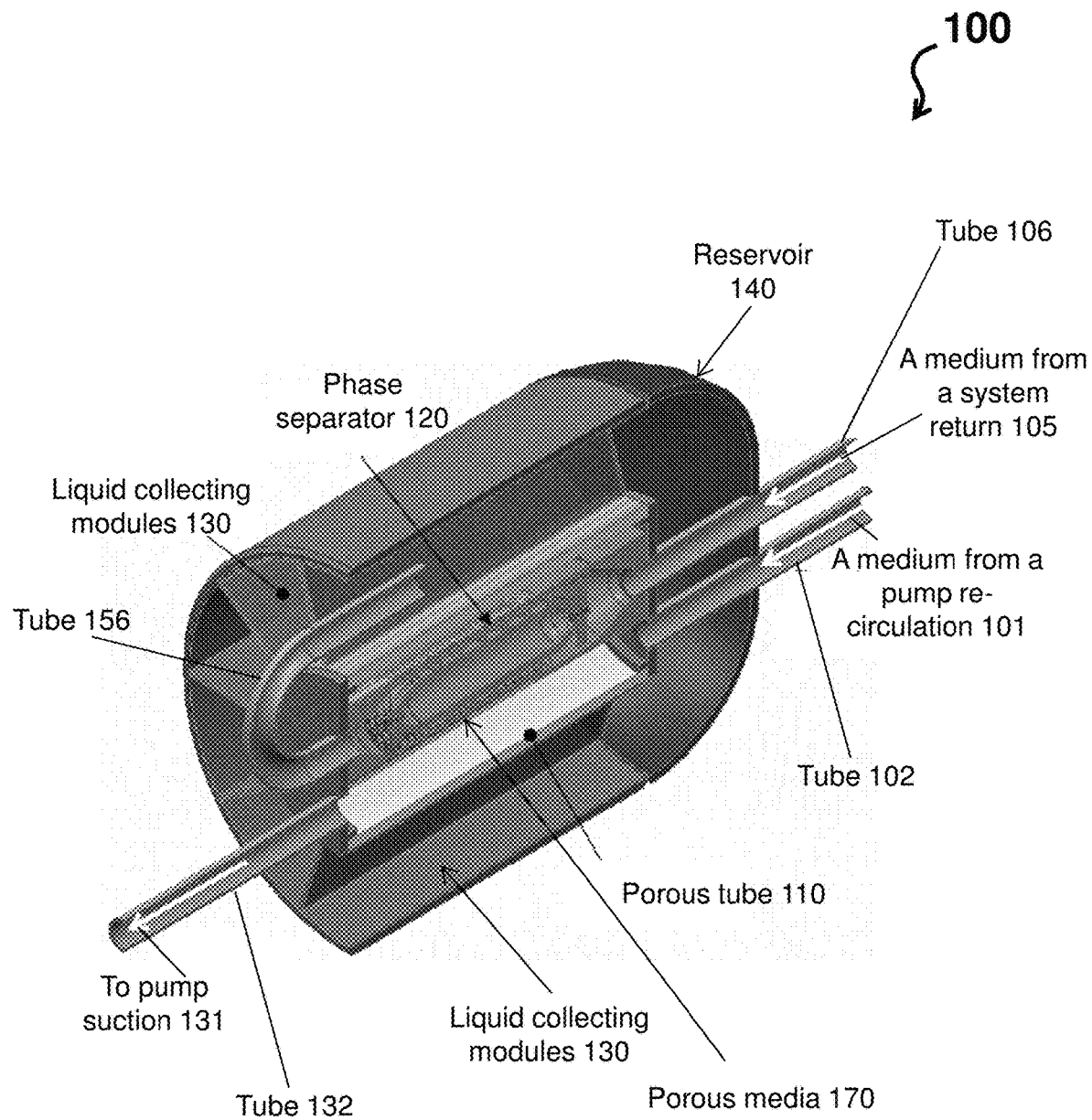
FIG. 1B depicts a perspective view of a cross-sectional view of an apparatus in accordance with one or more embodiments.

Turning now to FIGS. 1A and 1B, an apparatus 100 is depicted in accordance with one or more embodiments. In FIG. 1A, a cross-sectional view of the apparatus 100 is shown. In FIG. 1B, a perspective view of the cross-sectional view of the apparatus 100 is shown. Note that the numerical designations are continuous between FIGS. 1A and 1B.

The apparatus 100 is an example of the multifunctional phase separation apparatus described herein. The apparatus 100 receives a medium from a pump recirculation 101 via a tube 102 and a medium from a system return 105 via a tube 106 (e.g., tubes 102 and 106 are two entry ports into the multifunctional phase separation apparatus). The apparatus 100 comprises a porous tube 110, a phase separator 120, liquid collecting modules 130, and a reservoir 140. As shown, Note that the reservoir 140 is a closed container, i.e., with two end caps 140A and 140B. Note that the liquid collecting modules 130 have empty space between module walls to maximize an available storage space. Further, FIG. 1B shows the perspective view of the apparatus 100 with one end cap removed for the purpose of showing space between the liquid collecting modules 130 and the reservoir 140.

Note that a portion of the medium from the system return 105 flows through the phase separator and exits as a medium from a phase separator 155 via a tube 156. The apparatus 100 outflows a medium to a pump suction 161 via a tube 162 (e.g., a gas/vapor free liquid flows out of the multifunctional phase separation apparatus and fed to a pump).

In operation, the medium from the system return 105 enters the apparatus 100 via the tube 106. A centrifugal motion generated by the phase separator 120 forces the medium from the system return 105 to flow along an outer perimeter of a flow passage. A porous media (e.g., screen mesh 170) encloses an outside surface of the phase separator 120. The porous media captures the liquid and merges the captured liquid via the porous tube 110 to the medium from the recirculation line 101. A remaining portion of the medium from the system return 105, mainly in gaseous phase, continues to flow (e.g., as the medium from the phase separator 155) into a space comprising the liquid collecting modules 130 and the reservoir 140.

The medium from the phase separator 155 (e.g., the gaseous flow) enters the space (comprising the liquid collecting modules 130 and the reservoir 140) inside the apparatus 100 may contain some NCG and/or some vapor phase of a working fluid. After releasing any latent heat, the vapor phase of the working fluid condenses back to liquid phase and is randomly distributed inside the reservoir 140. The multiple liquid collecting modules 130 capture the randomly distributed liquid phase of the working fluid and move it toward the porous tube 110 utilizing a capillary force generated by the liquid collecting modules and the liquid phase of the working fluid. The NCG may be isolated inside the reservoir 140. The capillary force provided by the porous tube 110 and the liquid phase working fluid prevents the NCG from entering a pump recirculating line (e.g., the tube 131).

The medium from the pump recirculation 101 via the tube 102 is a medium of a recirculation line routed into the apparatus 100. This routing ensures that a feedline to the pump is always liquid filled. This routing ensures recovery of the liquid phase of the working fluid collected by the phase separator 120 and the liquid collecting modules 130 with minimum pressure drop. Note that a combination of any recovered liquid from the phase separator 120 and the liquid collecting modules 130, a pump recirculation flow (e.g., the medium from a pump recirculation 101), and a compensatory liquid flow through a wall of the porous tube 110 comprise a total outflow to the pump. With continuing operation, the NCG is also be captured and stored in the reservoir 140, and an NCG concentration decreases over time.

In addition, as shown in FIGS. 1A and 1B, an entirety of the medium from the system return 105 is guided into the phase separator 120 by the tube 106 while being isolated from a pump feedline (e.g., the tube 102). Thus, any solid particles in the medium from the system return 105 with a size larger than a pore size of the porous tube 110 is trapped in the apparatus 110. With continuous operation, an amount of large size solid particles in the medium from the system return 105 is reduced.

Figure 2:
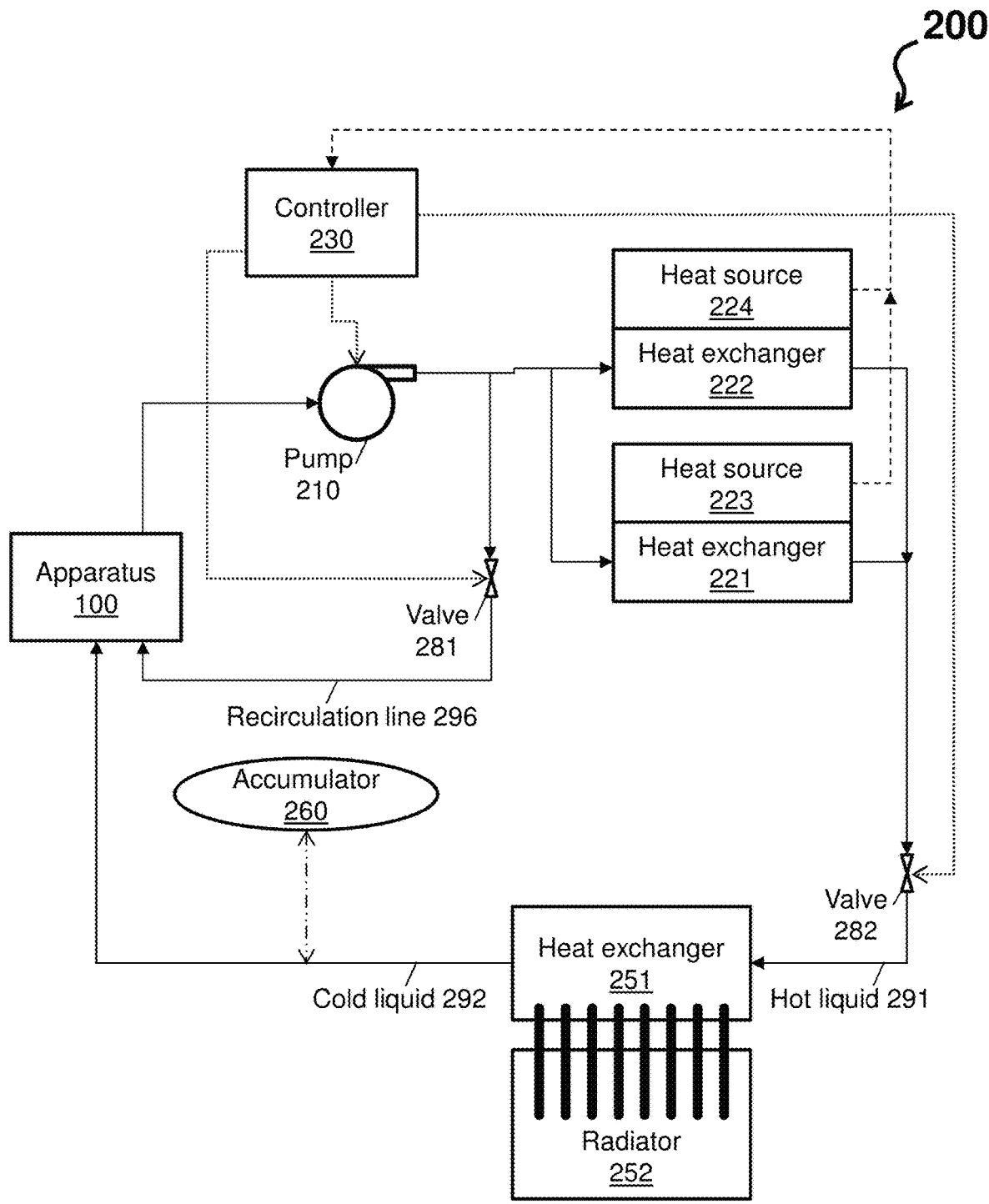
FIG. 2 depicts a system comprising an apparatus in accordance with one or more embodiments.

FIG. 2 depicts a system 200 comprising the apparatus 100 in accordance with one or more embodiments. More particularly, the system 200 is an example schematic diagram of a single phase mechanical pump flow loop with a multifunctional phase separation apparatus (e.g., apparatus 100) installed. The single phase mechanical pump flow loop of the system 200 comprises a pump 210, two heat exchangers 221 and 222, and two heat sources 223 and 224. The single phase mechanical pump flow loop of the system 200 also comprises a controller 230, a heat rejecting heat exchanger 251, a radiator 252, an accumulator, valve 281 and 282, a hot liquid 291, a cold liquid 292, and a recirculation line 296. The controller 230, which comprises at least a processor and a memory, controls the pump 210 (see dotted-lined arrows) and executes temperature sensing (see dashed-lined arrows) to operate a flow control of the valve 281 and 282 (see dotted-lined arrows).

The pump 210 exhausts a cold working fluid to the two heat exchangers 221 and 222, which are arranged in parallel as an example. After absorbing waste heat from the heat sources 223 and 224, the hot working fluid flows into the heat rejecting heat exchanger 251. The waste heat is rejected to the environment, such as through the radiator 252. The recirculation line 296 with the flow control valve (e.g., valve 281) ensures correct operations of the apparatus 100. Note that because of the apparatus 100, the system 200 does not require a filter.

Figure 3:
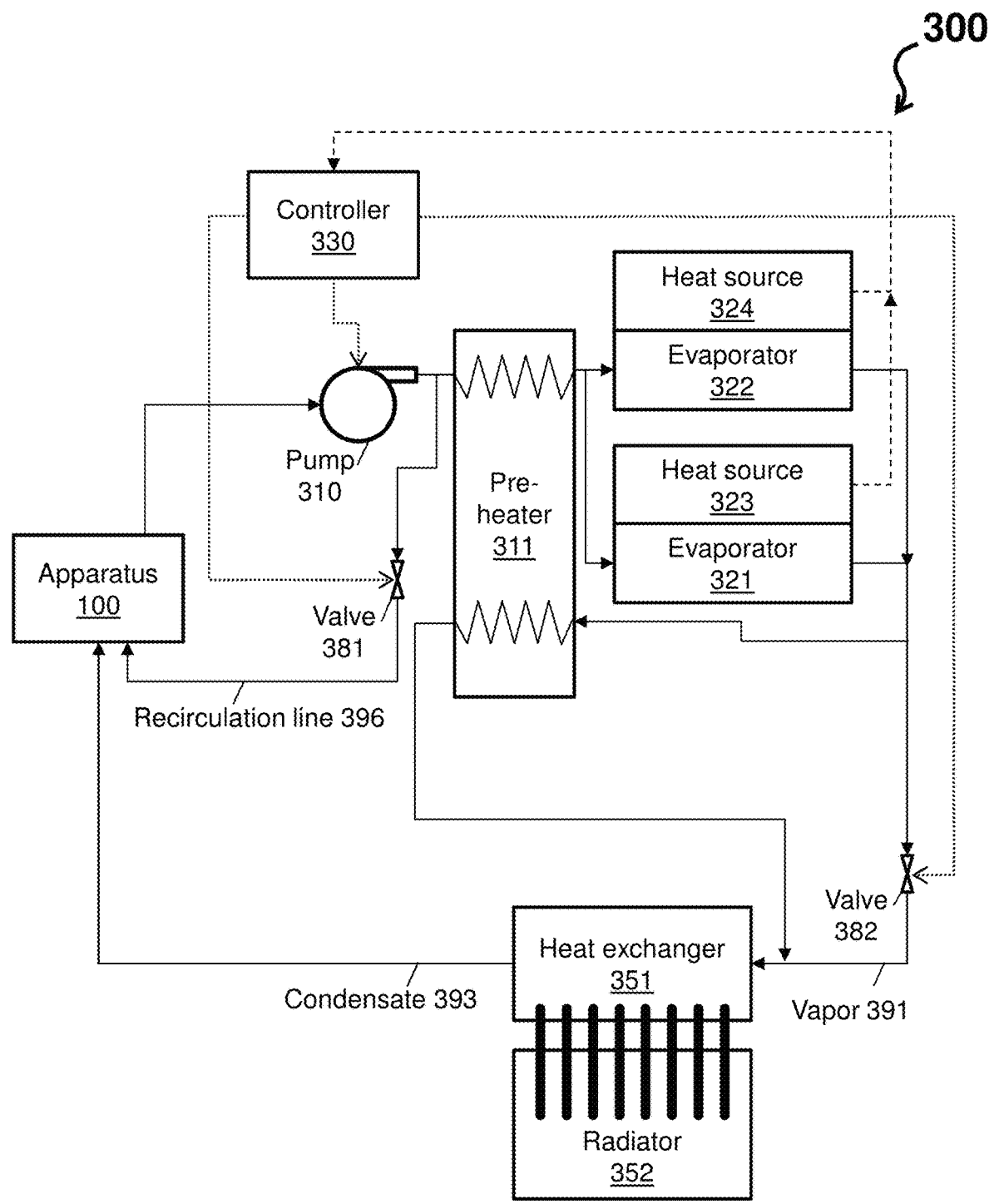
FIG. 3 depicts a system comprising an apparatus in accordance with one or more embodiments.

FIG. 3 depicts a system 300 comprising the apparatus 100 in accordance with one or more embodiments. More particularly, the system 300 is an example schematic diagram of a mechanical pump two phase flow loop with a multifunctional phase separation apparatus (e.g., apparatus 100) installed. The mechanical pump two phase flow loop of the system 300 comprises a pump 310, a preheater 311, two evaporators 321 and 322 (arranged in parallel as an example), and two heat sources 323 and 324. The mechanical pump two phase flow loop of the system 300 also comprises a controller 330, a heat exchanger 351, a radiator 352, valve 381 and 382, a vapor 391, a condensate 393, and a recirculation line 396. The controller 330, which comprises at least a processor and a memory, controls the pump 310 (see dotted-lined arrows) and executes temperature sensing (see dashed-lined arrows) to operate a flow control of the valve 381 and 382 (see dotted-lined arrows).

In addition to being a gas trap (e.g., capturing a gaseous phase in a liquid flow loop), the apparatus 100 can also serve as an accumulator in the two phase flow loop. For example, as shown in FIG. 3, the condensate 393 from the heat exchanger 351 is guided directly into the apparatus 100. When a flow loop is operated at low temperature, the apparatus 100 can replenish the two phase loop with liquid through the porous tube 110. When the flow loop is operated at high temperature, any excess liquid can be stored in the space of the apparatus 100.

In operation, waste heat is absorbed by the working fluid's latent heat. The vaporized working fluid flows through the heat exchanger 351 to reject the absorbed waste heat. After rejecting the waste heat, the vapor phase of the working fluid condenses back to liquid phase and exits the heat exchangers/condensers. The condensate exits the heat exchanger 351. The recirculation line 396 with an additional flow control valve (e.g., valve 381) ensures proper operation of the apparatus 100. Note that because of the apparatus 100, the system 300 does not require a two phase accumulator and/or a filter.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multifunctional phase separation apparatus comprising:
    a porous tube comprising a first entry port coupled to a recirculation line of a pump and an exit port;
    a phase separator within the porous tube comprising a second entry port into the porous tube coupled to a system return and configured to generate centrifugal motion to force a medium from the system return to flow along an outer perimeter of the phase separator;
    a porous media enclosing an outside surface of the phase separator and configured to capture liquid from the medium;
    a plurality of liquid collecting modules outside the porous tube configured to receive a remaining portion of the medium following capture of the liquid by the porous media; and
    a reservoir configured on a first end of the plurality of liquid collecting modules.

2. The multifunctional phase separation apparatus of claim 1, wherein the exit port of the porous tube is coupled to a pump.

3. The multifunctional phase separation apparatus of claim 1, wherein a space separates each of the plurality of liquid collecting modules to maximize an available storage space of the apparatus.

4. The multifunctional phase separation apparatus of claim 1, wherein a second reservoir is configured on a second end of the liquid collecting modules, the second end opposing the first end.

5. The multifunctional phase separation apparatus of claim 1, wherein a mechanically pumped single phase flow loop system comprises the multifunctional phase separation apparatus of the claim.

6. The multifunctional phase separation apparatus of claim 1, wherein a mechanically pumped two phase flow loop system comprises the multifunctional phase separation apparatus of the claim.

7. A mechanical pump flow loop system comprising:
    a pump; and
    a multifunctional phase separation apparatus comprising:
        a porous tube comprising a first entry port coupled to a recirculation line of a pump and an exit port, the exit port of the porous tube being coupled to the pump;
        a phase separator within the porous tube comprising a second entry port into the porous tube coupled to a system return and configured to generate centrifugal motion to force a medium from the system return to flow along an outer perimeter of the phase separator;
        a porous media enclosing an outside surface of the phase separator and configured to capture liquid from the medium;
        a plurality of liquid collecting modules outside the porous tube configured to receive a remaining portion of the medium following capture of the liquid by the porous media; and
        a reservoir configured on a first end of the plurality of liquid collecting modules.

8. The mechanical pump flow loop system of claim 7, wherein a space separates each of the plurality of liquid collecting modules to maximize an available storage space of the apparatus.

9. The mechanical pump flow loop system of claim 7, wherein a second reservoir is configured on a second end of the liquid collecting modules, the second end opposing the first end.

10. The mechanical pump flow loop system of claim 7, wherein the mechanical pump flow loop system is a single phase flow loop system.

11. The mechanical pump flow loop system of claim 7, wherein the mechanical pump flow loop system is a two phase flow loop system.

* * * * *